US011830133B2

(12) United States Patent
Lu et al.

(10) Patent No.: US 11,830,133 B2
(45) Date of Patent: Nov. 28, 2023

(54) CALCULATION METHOD OF THREE-DIMENSIONAL MODEL'S SPHERICAL EXPRESSION BASED ON MULTI-STAGE DEFORMATION RECONSTRUCTION

(71) Applicant: Beihang University, Beijing (CN)

(72) Inventors: Feng Lu, Beijing (CN); Zongji Wang, Beijing (CN)

(73) Assignee: Beihang University, Beijing (CN)

( * ) Notice: Subject to any disclaimer, the term of this patent is extended or adjusted under 35 U.S.C. 154(b) by 139 days.

(21) Appl. No.: 17/571,196

(22) Filed: Jan. 7, 2022

(65) Prior Publication Data

US 2022/0222891 A1    Jul. 14, 2022

(30) Foreign Application Priority Data

Jan. 13, 2021    (CN) .......................... 202110043355.9

(51) Int. Cl.
*G06T 17/00*     (2006.01)
*G06T 3/40*      (2006.01)

(52) U.S. Cl.
CPC ................ *G06T 17/00* (2013.01); *G06T 3/40* (2013.01); *G06T 2207/10028* (2013.01)

(58) Field of Classification Search
None
See application file for complete search history.

(56) References Cited

U.S. PATENT DOCUMENTS

2020/0210814 A1 * 7/2020 Mehr ...................... G06N 3/045
2020/0250540 A1 * 8/2020 Mehr ...................... G06T 17/20

FOREIGN PATENT DOCUMENTS

EP    3674983 A1 * 7/2020    ............. G06F 30/17
EP    3674984 A1 * 7/2020    ............. G06F 30/27

* cited by examiner

*Primary Examiner* — Kent W Chang
*Assistant Examiner* — Jonathan M Cofino

(57) ABSTRACT

The embodiments of the present disclosure disclose a three-dimensional model's spherical expression calculation method. A specific implementation of the method includes: processing an input three-dimensional model into a dense point cloud model; inputting the dense point cloud model to a multi-level feature extraction module, extracting high-dimensional feature vectors of different abstract levels; inputting the high-dimensional feature vectors, template ball point cloud and abstract preprocessed point cloud model to a point cloud deformation reconstruction module to obtain a deformed reconstruction point cloud model; extracting multi-stage deformation reconstruction process information, combining the multi-stage deformation reconstruction process information with the template ball point cloud to together form complete information describing the three-dimensional model; obtaining a density correspondence from the three-dimensional model to the template ball point cloud and a density correspondence between different three-dimensional models. This implementation does not require time-consuming and labor-intensive manual annotations, improving the efficiency of characterization learning.

7 Claims, 6 Drawing Sheets

CALCULATION METHOD OF THREE-DIMENSIONAL MODEL'S SPHERICAL EXPRESSION BASED ON MULTI-STAGE DEFORMATION RECONSTRUCTION

CROSS-REFERENCE TO RELATED APPLICATION

The present application is based on, and claims priority from, Chinese application number CN202110043355.9, filed Jan. 13, 2021, the disclosure of which is hereby incorporated by reference herein in its entirety.

TECHNICAL FIELD

The embodiments of the present disclosure relate to the field of computer technology, and in particular, to a calculation method of three-dimensional model's spherical expression.

BACKGROUND

In the field of three-dimensional computer graphics, coarse-to-fine methods are widely used, including three-dimensional shape reconstruction, shape generation, category recognition, semantic segmentation, and so on. However, how to learn and extract general-purpose three-dimensional shape expressions from the coarse-to-fine shape generation process is still at a relatively preliminary stage.

When solving the problem of category recognition and semantic segmentation of three-dimensional shapes, many methods use a coarse-to-fine manner, to extract and fuse multi-scale features to enhance the description ability of feature coding. When solving the three-dimensional shape reconstruction and generation problem, shape details can be gradually added during the generation process in a coarse-to-fine manner, so the original problem can be broken down and simplified into multiple sub-problems. Recent methods usually aggregate features of different scales into a comprehensive feature to solve a specific task. They are task-driven methods.

However, when using the above methods to learn and extract general-purpose three-dimensional shape expressions, there are often the following technical problems:

Task-driven learning usually requires a lot of manpower to make annotations, such as object category labels, point-by-point component semantic labels, dense correspondences, and so on. This speed at which knowledge is given is far slower than the rapid growth of Internet data today. Besides that the task-driven methods are highly dependent on data annotations, the learned features are often highly restricted to specific tasks, which reduces the general applicability of the learned features. In the context of this era of rapid growth of big data, semi-supervised, self-supervised, and unsupervised general purpose characterization learning methods have received extensive attention. One is that they can reduce learning costs, and the other is that the learned characterization can be further used in a variety of applications.

SUMMARY

The content of the present disclosure is to introduce concepts in a brief form, and these concepts will be described in detail in the following section of the detailed description. The content of the present disclosure is not intended to identify the key features or essential features of the claimed technical solution, nor is it intended to limit the scope of the claimed technical solution.

Some embodiments of the present disclosure propose a three-dimensional model's spherical expression method to solve one or more of the technical problems mentioned in the background section above.

Some embodiments of the present disclosure provide a three-dimensional model's spherical expression method, the method includes: processing an input three-dimensional model into a surface dense point cloud model, and performing multi-resolution point cloud abstract preprocessing; inputting the dense point cloud model into a feature extraction network, gradually down-sampling the point cloud and extracting high-dimensional feature vectors of different abstract levels to obtain high-dimensional feature vectors; inputting the high-dimensional feature vectors, from coarse to fine, into a point cloud deformation reconstruction module respectively together with a reconstruction result whose number of points is less than a first predetermined threshold, and by calculation obtaining a reconstruction result whose number of points is greater than a second predetermined threshold, and repeating this step until the finest-scale deformation reconstruction is completed; extracting multi-stage deformation reconstruction process information, and together with the initial template ball point cloud, forming complete information that describes this three-dimensional shape, which we define as the three-dimensional ball expression of the shape; using the three-dimensional model's spherical expression as the basis, capable of obtaining the density correspondence from an object to the template ball point cloud, and the density correspondence between objects, which are suitable for a variety of three-dimensional geometric analysis and editing applications.

The above embodiments of the present disclosure have the following beneficial effects: a general-purpose three-dimensional characterization calculation method is proposed. This characterization is called a three-dimensional model's spherical expression, which is achieved by encoding the process of deforming and reconstructing the three-dimensional shaped template. When the model is gradually refined from the template ball point cloud into a shape with specific functions and features, the object's category, style and other attributes are gradually revealed too, so a three-dimensional model's spherical expression calculation method is proposed. In the three-dimensional model's spherical expression, the model shape is modeled as a series of deformations from the template ball point cloud. Therefore, based on the template ball point cloud, this expression builds a connection between different models. This correspondence is the basis of the generality of the three-dimensional model's spherical expression. In order to learn this expression, a coarse-to-fine auto-encoding framework based on deformation reconstruction is proposed. Some application examples using this expression are also proposed. Compared with the prior art, the advantage is that: the three-dimensional model's spherical expression can be learned through an unsupervised self-reconstruction framework, and no time-consuming and labor-intensive manual annotation is required, which improves the efficiency of characterization learning. In characterization learning, multi-scale features act as guiding conditions for different reconstruction stages respectively, instead of being directly aggregated into a hidden vector to solve high-level three-dimensional perception tasks. This enables the characterization to encode the knowledge of each reconstruction stage and facilitates further research on features at different scales.

The template deformation framework used to learn this characterization naturally provides a point-to-point correspondence between the template and the reconstructed model.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION OF THE INVENTION

Figure 1:
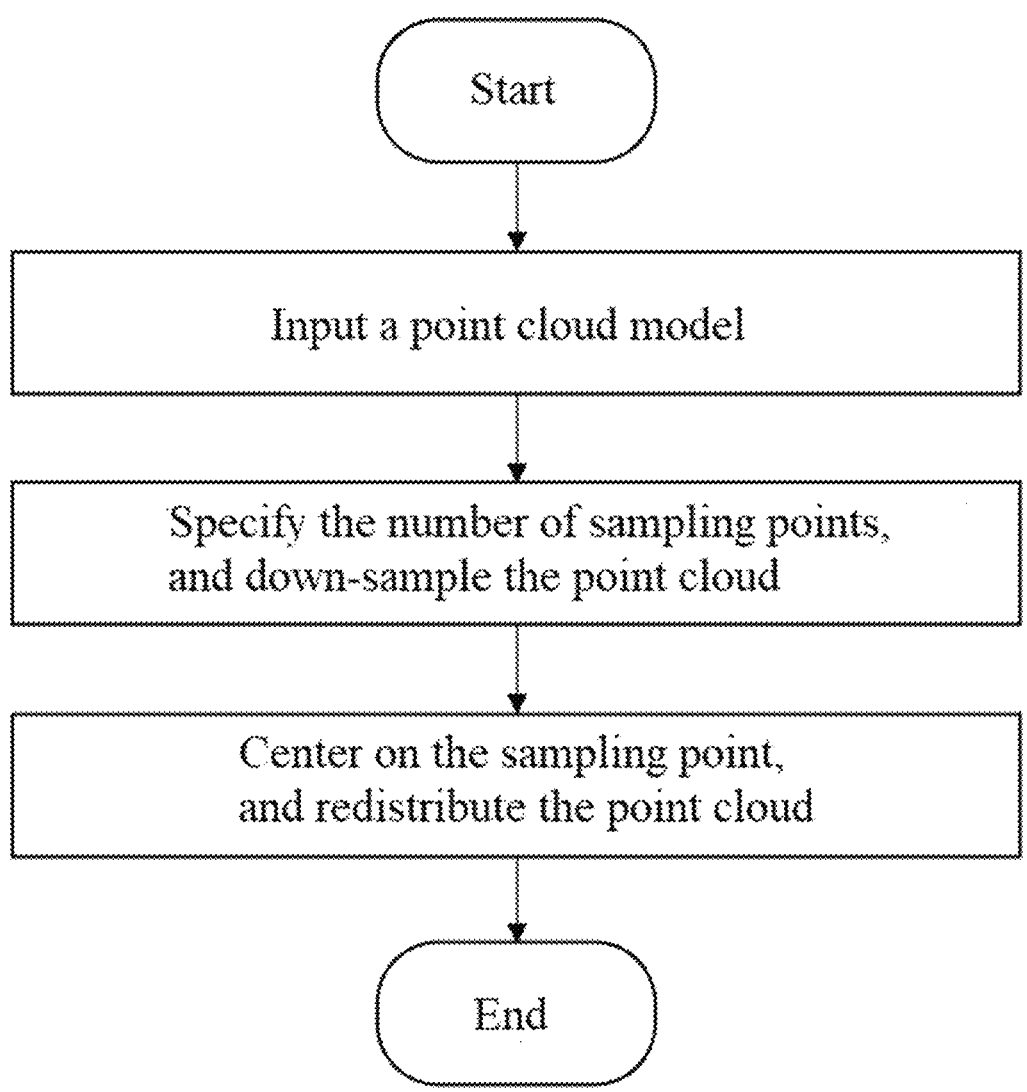
FIG. 1 is a flowchart of data processing in the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant disclosure are shown in the drawings. In the case of no conflict, the embodiments in the present disclosure and the features in the embodiments can be combined with each other.

It should be noted that such adjuncts as "one" and "more" mentioned in the present disclosure are illustrative, not restrictive, and those skilled in the art should understand that, unless the context clearly indicates otherwise, they should be understood as "one or more".

The following is a detailed description of the present disclosure with reference to the drawings and in conjunction with embodiments.

Introduction is made in the order of point cloud data preparation, three-dimensional model's spherical expression calculation, and expression for application scenario examples. The three have an order-dependent relationship. The point cloud data preparation processes the point cloud into a multi-resolution reconstruction target to guide the calculation of the three-dimensional model's spherical expression; after the ball expression is obtained, it can be used for three-dimensional editing and other applications.

I. Point Cloud Data Preparation

As shown in FIG. 1, the steps are as follows:

First, input a three-dimensional shaped surface point cloud, and sample the farthest point of the point cloud according to the specified number of sampling points to obtain a down-sampled point cloud. Then, based on each sampling point as the center, add point cloud according to Gaussian distribution, so that the number of points contained in the point cloud reaches the same number as before the down-sampling, and complete the point cloud down-sampling and redistribution. The surface dense point cloud model is a point cloud where the number of surface points is greater than a predetermined number.

Figure 2:
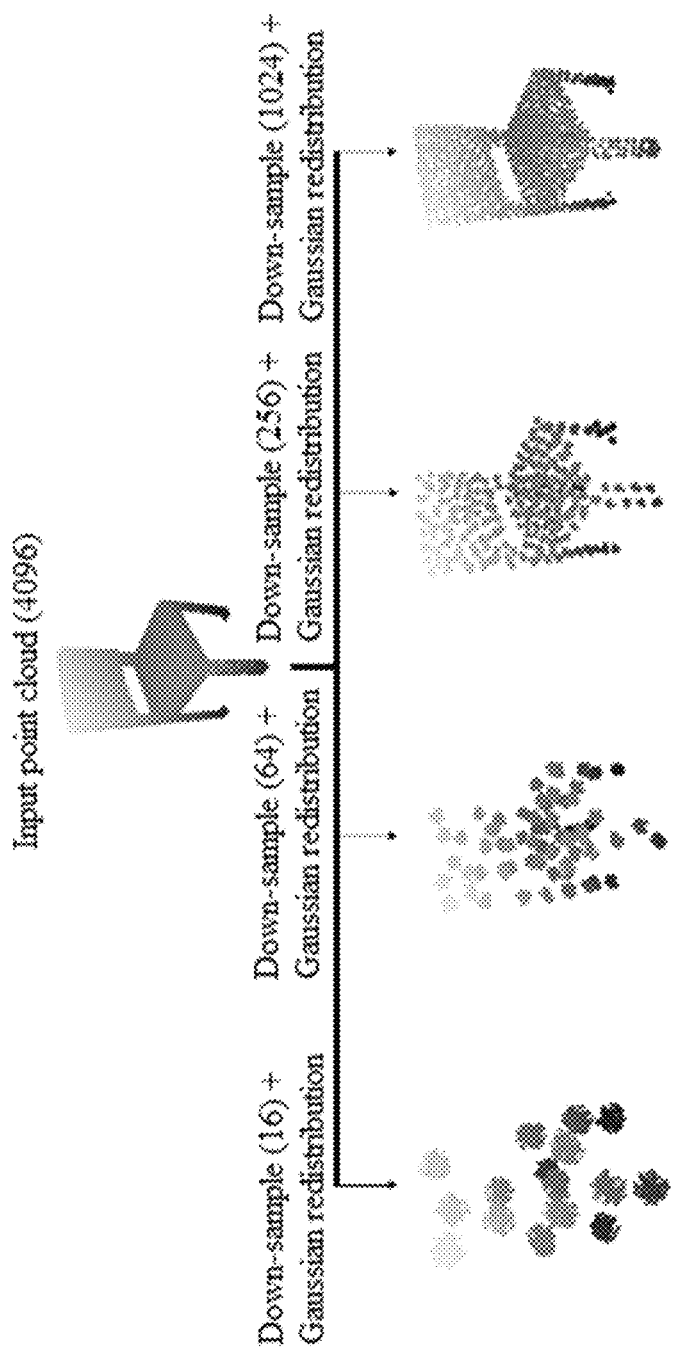
FIG. 2 is a schematic diagram of the application scenario for multi-resolution point cloud data generation in the present disclosure.

FIG. 2 is an example of multi-resolution point cloud data generation. It can be seen that the input point cloud has 4096 points, and after down-sampling, point clouds with different resolutions of 16, 64, 256, and 1024 points are obtained respectively; after Gaussian redistribution, a number of point clouds are inserted with the sampling point as the center, and finally a point set consisting of 4096 points equipotential to the input point cloud is obtained. Wherein, the Gaussian redistribution may be the 16-point model on the far left, which describes the overall shape of the model and represents an abstract model chair. The one with more sampling points on the right can describe more local details, being a specific model. Redistribution is to increase the number of sparse points after down-sampling, so that the point cloud models of different abstract levels have the same number of points. Take each sampling point as the center. New points are randomly inserted according to Gaussian distribution, and finally a re-distributed model is obtained, which has the same number of points as the original model. The abstract preprocessed point cloud model may be a massive point set that expresses the target spatial distribution and the target surface characteristic under the same spatial reference system. What is obtained through the preprocessing after obtaining the spatial coordinates of each sampling point on the surface of the object, is a set of points.

II. Three-Dimensional Model's Spherical Expression Calculation

Figure 3:
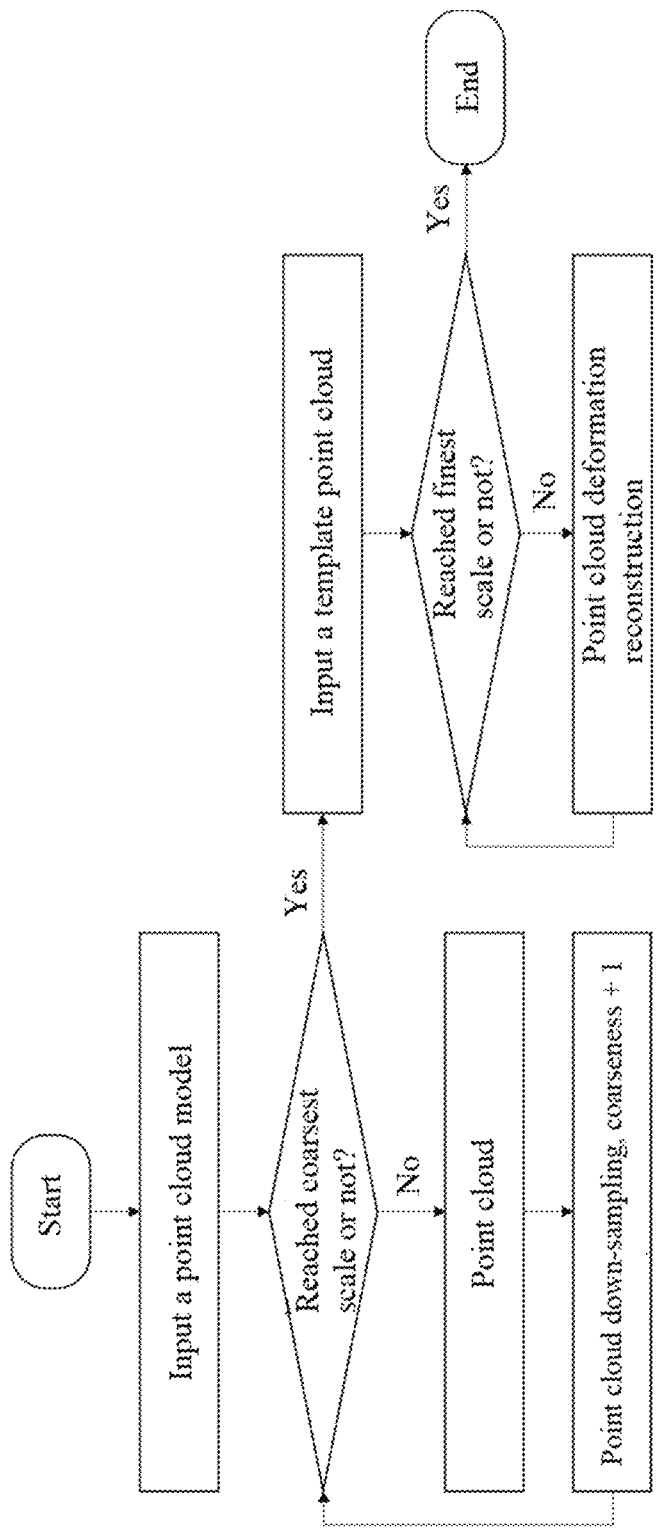
FIG. 3 is a flowchart of the three-dimensional model's spherical expression calculation in the present disclosure.

As shown in FIG. 3, the steps are as follows:

To calculate the three-dimensional model's spherical expression, a self-encoding process from coarse to fine based on deformation reconstruction is required. First, input a three-dimensional model point cloud, determine whether to iteratively perform point cloud feature extraction and point cloud down-sampling according to the specified highest abstract level, retain the extracted high-dimensional deep learning features of each stage for the next reconstruction stage; after the feature extraction at the highest abstract level, enter the point cloud deformation reconstruction stage. First, input a three-dimensional template ball point cloud, predict the point-by-point deformation offset under the guidance of the deep learning feature of the coarsest scale, superimpose to obtain the reconstructed point cloud at this scale, the reconstruction target being generated at the point cloud data preparation stage; when the reconstruction result of the most refined level is not reached, repeat the point cloud reconstruction process, and obtain a fine reconstruction shape in the end.

The input template ball point cloud in the self-encoding process from coarse to fine based on deformation reconstruction, the point-by-point offset of the $K^{th}$ abstract level, and the high-dimensional deep learning features at the feature extraction stage are combined to form a set, to complete the three-dimensional model's spherical expression of said model.

III. Examples of Application

The prerequisite for the three-dimensional model's spherical expression to establish a density correspondence between models is that the three-dimensional models must be pre-aligned first, that is, to have consistent three-dimensional orientation and scale, which can be achieved by means of existing model alignment methods.

Figure 4:
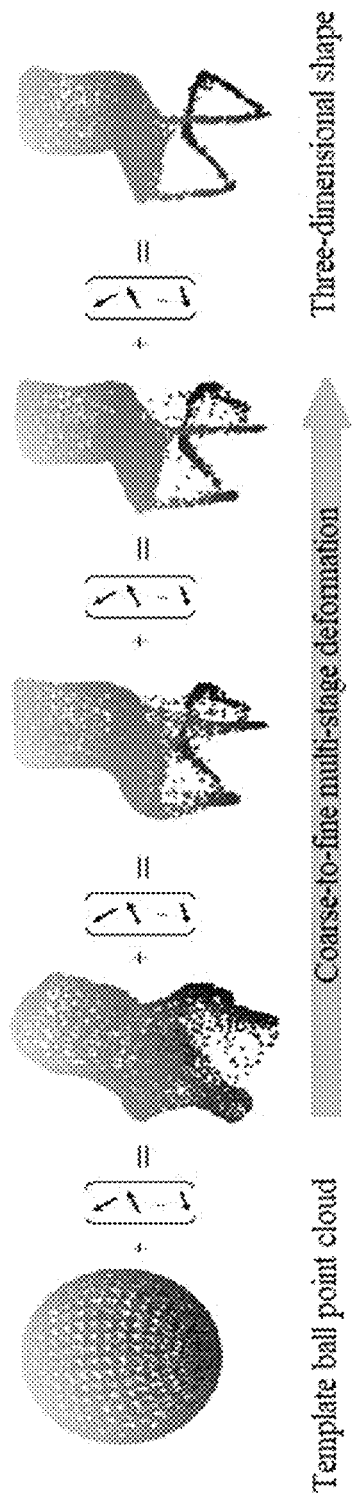
FIG. 4 is a schematic diagram of the application scenario for multi-stage deformation reconstruction in the present disclosure.
Figure 5:
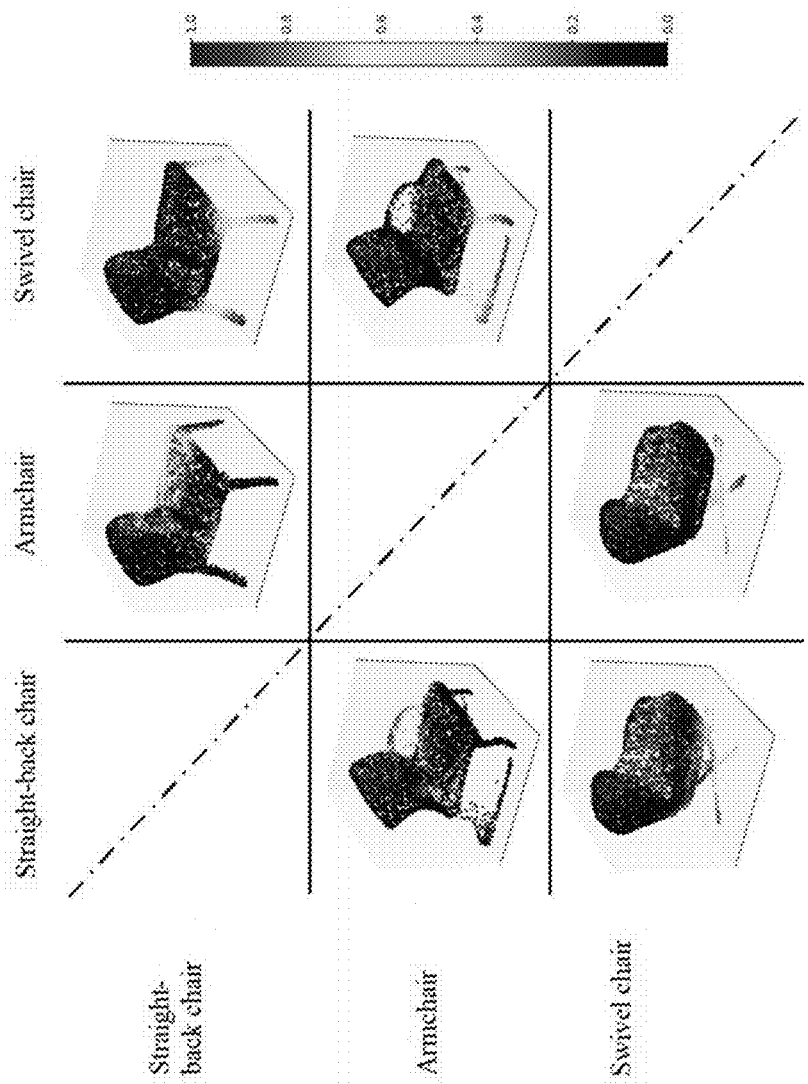
FIG. 5 is a schematic diagram of the application scenario for three-dimensional model's spherical expression in shape attribute positioning in the present disclosure.

As shown in FIG. 5, three different types of chairs, such as ordinary straight-back chairs, armchairs, and swivel chairs, establish a point-by-point density correspondence through the ball expression. We first input the reconstructed model into a classifier network. After completion of the classification, find the corresponding highest feature map channel of the corresponding category, then visually map the feature map to the input point cloud, thus obtain the "category determining area" shown in FIG. 4, wherein the highlighted area may be the most obvious different part between the two categories. For example, in the first row and second column, it can be seen that the difference between a straight-back chair and an armchair is in the position of the armrest (with or without an armrest); in the first row and the third column, the difference between an ordinary straight-back chair and a swivel chair lies in the shape of the legs. Similar observations can be obtained in other grids. This kind of object attribute area positioning is very helpful for many applications. For example, in the task of shape style analysis, we can locate which part of the shape determines the style, and thereby edit it in a targeted manner.

Figure 6:
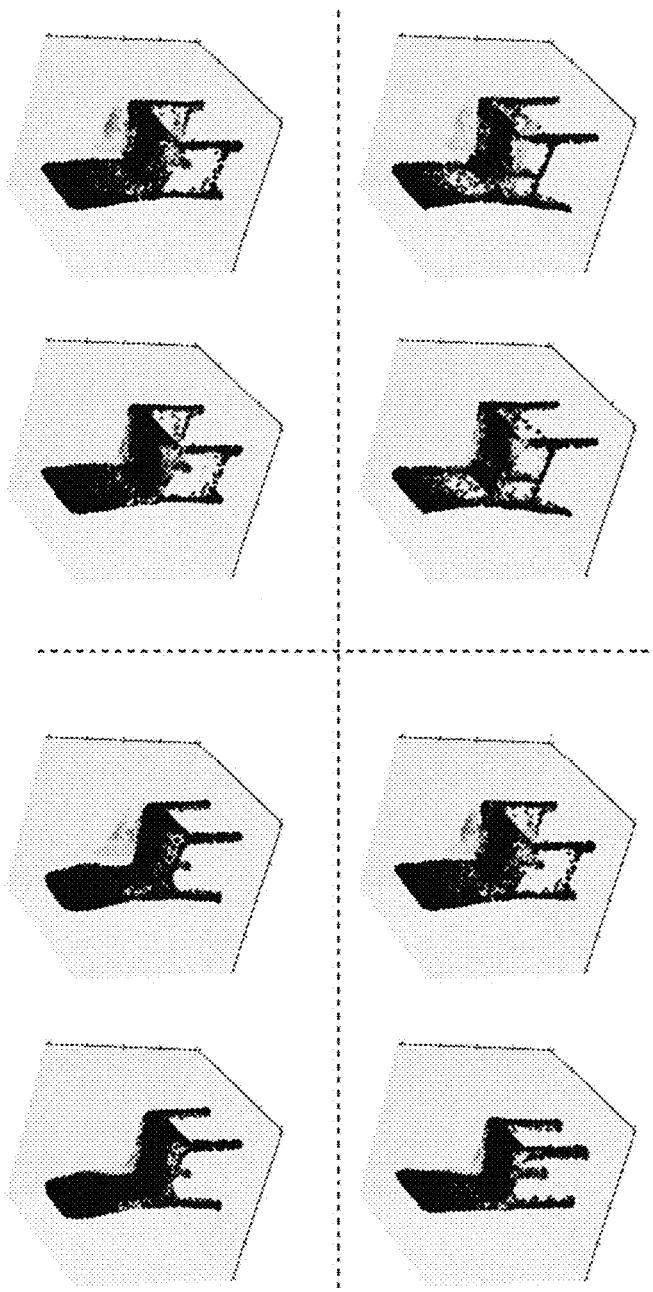
FIG. 6 is a schematic diagram of the application scenario for three-dimensional model's spherical expression in three-dimensional co-editing in the present disclosure.

As shown in FIG. 6, after locating the difference area between the ordinary straight-back chair and the armchair, we can keep the other areas unchanged, and achieve co-editing of multiple models only by editing this area. In each grid, the left side is the ordinary straight-back chair before deformation, and the right side is the armchair obtained by editing the highlighted area. The other features of the left straight-back chair are maintained, adding only the armrests. The relevant areas of multiple chairs are located through the density correspondence of the ball expression, and the deformation operation can be performed at the same time. This kind of co-editing is of great significance to the construction of virtual reality scenes, the enrichment of model libraries, and the design of three-dimensional shapes.

Next, the concept definition, calculation method, and data processing of the present disclosure are described in detail.

I. Definition of the Three-Dimensional Model's Spherical Expression

This is a novel way of three-dimensional shape expression, characterized by explicitly encoding the coarse-to-fine multi-stage deformation reconstruction process. This expression has the following characteristics:

(1) The shapes of models are all formed of deformation from the unified template, so the point-to-point correspondence between the models can be easily obtained.

(2) The point cloud data has high adaptability. Because there is no coding topological connection relationship, the template has the ability to fit the model of complex topological structure.

(3) Through the three-dimensional model's spherical expression, it is possible to model a hierarchical and progressive shape generation process, which provides benefits for many high-level graphics applications.

The point cloud model refers to the surface point cloud of the three-dimensional model. Points are sampled on the surface of the three-dimensional model, and a series of three-dimensional points are used to express the model. As shown in FIG. 2, the dense point cloud model means that the sampling frequency of the point cloud is high, here it means 4096 points. The template ball point cloud is a point cloud model of abstract level k=K, being an initial model.

In the three-dimensional model's spherical expression, a three-dimensional shape S is modeled as the sum of a template ball point cloud $T^K$ and its multi-stage point-by-point offset $D^k$ from the template to the three-dimensional shape surface, wherein, the three-dimensional model's spherical is:

$$S = T^K + \Sigma_{k=1}^{K} D^k.$$

Wherein, S represents the three-dimensional model's spherical. $T^K$ represents the deformation reconstruction model of the $k^{th}$ abstract level, and it can also be a template ball point cloud. $D^k$ represents the point-by-point offset of the deformation reconstruction of the $k^{th}$ abstract level. k represents the serial number of the abstract levels. K represents the number of abstract levels. That is, the three-dimensional model conveys a complete expression through a ball. The high-dimensional feature vector $Z^k$ of the $k^{th}$ abstract level can be used to enrich the model description at this stage. Note that the three-dimensional point cloud required for ball expression only focuses on three-dimensional point position information, and does not contain such information as point color. However, the high-dimensional feature vector $Z^k$ can be extended to include other additional information than the spatial position, with good extendibility. $S=\{p_i | p_i \in R^3, i \in \{1, \ldots, n\}\}$ is a point cloud model composed of n three-dimensional points. Wherein, S represents the three-dimensional model's spherical. $p_i$ represents any point in the point cloud model. $T=\{p_i | p_i \in R^3, i \in \{1, \ldots, n\}\}$ is a template ball point cloud composed of n three-dimensional points. Wherein, T represents the template ball point cloud. $D:=\{D^k | k \in \{1, \ldots, K\}\}$ is a set of point-by-point offsets of the abstract level. Wherein, $D^k$ represents the point-by-point offset of the deformation reconstruction of the $k^{th}$ abstract level. $D^k=\{d_i^k | d_i^k \in R^3, i \in \{1, \ldots, n\}\}$ is the deformation offset from k+1(coarse) to k (fine) level, corresponding to $T^k$ point by point. Wherein, $d_i^k$ represents the point-by-point offset of the deformation reconstruction of the point in the point cloud model at the $k^{th}$ abstract level.

The point-by-point offset of the deformation reconstruction may be the distance moved by the high-dimensional feature vector according to the deformation reconstruction model.

Considering that different three-dimensional point clouds usually have different point orders, the above equation is therefore not universal. Therefore, we further model the relationship among the three-dimensional shape, the template ball point cloud, and the point-by-point offset as:

$$R = \min_{D} dist\left(S, T^K + \sum_{k=0}^{K} D^k\right).$$

Wherein, R represents the relationship model between the three-dimensional shape and the template ball point cloud. S represents the three-dimensional model's spherical. $T^K$ represents the deformation reconstruction model of the $k^{th}$ abstract level, and it can also be a template ball point cloud. $D^k$ represents the point-by-point offset of the deformation reconstruction of the $k^{th}$ abstract level. k represents the serial number of the abstract levels. K represents the number of abstract levels.

This objective function optimizes the multi-stage offset and minimizes the distance between the original three-dimensional shape and the reconstructed shape, being an equivalent approximate expression defined by the equation. Therefore, the three-dimensional model's spherical can be fully expressed through the template point cloud ball and the multi-stage point-by-point offset. We define the three-dimensional model's spherical expression as follows:

$$S:=\{T^K, D^k, z^k | k \in \{1, \ldots, K\}\}.$$

Wherein, S: represents the three-dimensional model's spherical expression. k represents the serial number of the abstract levels. $T^K$ represents the deformation reconstruction model of the $k^{th}$ abstract level, and it can also be a template ball point cloud. $D^k$ represents the point-by-point offset of the deformation reconstruction of the $k^{th}$ abstract level. $z^k$ represents the high-dimensional feature vector of the $k^{th}$ abstract level.

The additional feature is to enrich the shape description, which can be the color of the point cloud, the normal direction, or even the high-dimensional hidden vector in the feature extraction process.

II. Three-Dimensional Model's Spherical Expression Calculation Method (1) Calculation Process In order to calculate the three-dimensional shaped ball expression, we design a CFDAE (Coarse-to-Fine Deformation-based Auto-Encoder) to learn this general-purpose three-dimensional expression without supervision.

First, an abstract preprocessed point cloud model input algorithm is used for multi-scale feature extraction, and high-dimensional feature vectors of different abstract levels can be obtained. The input signal is non-linearly mapped (by multilayer perceptron) to the feature space, and a 256-dimensional feature vector is used to represent the model. This 256-dimensional feature vector can be a high-dimensional feature vector. In this step, features of different abstract levels are extracted through point set abstraction and nonlinear neural networks. Here, we use the corresponding modules of the PointNet++ network to perform this task (this is only a representative example of the steps of the present disclosure, and any equivalent transformation made to the technical solution of the present disclosure shall belong to the protection scope of the present disclosure). Wherein, PointNet++ divides the point cloud locally and extracts local features to obtain a global point cloud feature. PointNet++ solves the problem of how to deal with uneven sampling, and also considers the distance measurement between points in space. It uses local area information to learn features through the hierarchical structure, and the network structure is more effective and more robust. The process of feature extraction is a process that gradually increases in abstraction degree, that is, a process from fine to coarse; while the multi-stage deformation reconstruction step is a process from coarse to fine that gradually enriches geometric details. The point cloud deformation reconstruction module is to offset the input point cloud point by point to obtain a deformed point cloud, as shown in FIG. 1. The input is the three-dimensional point cloud with the previous abstract level (coarser) and the high-dimensional features of the current abstract level (finer); the output is the offset corresponding to each point, and superimposed on the input three-dimensional point cloud, thus resulting in a deformed point cloud.

The highest level abstract feature and the template ball point cloud are together input to the point cloud reconstruction module, and mapped through the multi-layer nonlinear neural network to an offset field composed of point-by-point three-dimensional offsets, then superimposed on the input coarse point cloud, thereby resulting in a more finer hierarchical point cloud reconstruction result at this stage. Repeat the above reconstruction steps until the most refined hierarchical point cloud reconstruction result is obtained. The feature extraction network is used to extract a high-dimensional feature vector. The high-dimensional feature vector may be a 256-dimensional vector.

The calculation step of the main variables in the above CFDAE process can be expressed as:

$$\begin{cases} z^k = f(z^{k-1}, \hat{S}^k) \\ D^k = g(z^k, T^{k+1}) \\ T^k = T^{k+1} + D^k \end{cases}.$$

Wherein, $f( \ )$ represents the feature extraction function. $g( \ )$ represents the point cloud reconstruction function. The function $f( \ )$ represents the feature extraction network, which inputs the deep learning features of the low abstract level and the down-sampled point cloud of the current abstract level, and outputs the deep learning features of the current abstract level. The function $g( \ )$ is the point cloud reconstruction network, which inputs the deep learning features of the current scale, and the adjacent reconstructed point cloud, and outputs the point-by-point offset deformation field (finer scale). k represents the serial number of the abstract levels, $k \in [1,K]$. The larger the k value, the higher the abstract level, and the coarser the shape represented. In particular, $k=0$ is when the scale is the finest. $\hat{S}^k$ represents the abstract preprocessed point cloud model of the $k^{th}$ abstract level. $T^0$ is the reconstructed point cloud of the finest level. $k=K$ is when the scale is the coarsest. $T^k$ is the reconstructed point cloud of the coarsest level, that is, the input template not deformed. $z^k$ represents the high-dimensional feature vector of the $k^{th}$ abstract level. $z^{k-1}$ represents the high-dimensional feature vector of the $k-1^{th}$ abstract level. $T^k$ is the deformation reconstruction model of the $k^{th}$ level. $T^{k+1}$ is the deformation reconstruction model of the $k+1^{th}$ level. $D^k$ represents the point-by-point offset of the deformation reconstruction of the $k^{th}$ abstract level. For any abstract level k, $\hat{S}^k$ represents the down-sampling point cloud template obtained by $S^0$ down-sampling k times. The reconstructed point cloud $T^k$ is the superposition of the reconstructed point cloud $T^{k+1}$ and the point-by-point offset deformation field $D^k$. Through this process, the three-dimensional model's spherical expression can be obtained:

$$S:=\{T^K, D^k, z^k | k \in \{1, \ldots, K\}\}.$$

Wherein, S: represents the three-dimensional model's spherical expression. k represents the serial number of the abstract levels. $T^K$ represents the deformation reconstruction model of the $k^{th}$ abstract level, and it can also be a template ball point cloud. $D^k$ represents the point-by-point offset of the deformation reconstruction of the $k^{th}$ abstract level. $z^k$ represents the high-dimensional feature vector of the $k^{th}$ abstract level.

(2) Target Constraint Conditions

Through the above calculation process, the three-dimensional model's spherical expression can be extracted in the coarse-to-fine multi-stage deformation reconstruction process. In order to complete the three-dimensional shaped reconstruction task, corresponding constraint conditions shall be required, to be specific:

(2.1) A multi-stage shape similarity constraint condition, for use in the multi-stage deformation reconstruction process, to keep the reconstruction results of each stage similar to the reconstruction goal of this stage. This is the basic goal of shape reconstruction, and here we shall consider adding multi-stage reconstruction.

The point set distance includes CD (Chamfer Distance) and EMD (Earth Mover's Distance). Here, CD is used to measure the difference between two point clouds. The shape similarity constraint condition of the scale k is:

$$L_{CD}(k) = \sum_{p_i \in S^k} \min_{p_i \in T^k} \|p_i - q_j\|_2^2 + \sum_{q_j \in T^k} \min_{q_j \in S^k} \|p_i - q_j\|_2^2.$$

Wherein, k represents the serial number of the abstract levels. $L_{CD}(k)$ represents the CD of the $k^{th}$ deformation stage $S^k$ and $T^k$, $S^k$ represents the preprocessed resampling model of the $k^{th}$ abstract level. $T^k$ is the deformation reconstruction model of the $k^{th}$ abstract level. $p_i$ represents a point in the point cloud model $S^k$. $q_j$ represents a point in the point cloud model $T^k$.

The above formula calculates the distance between two point sets. The specific calculation method is to calculate the square of the distance between the above arbitrary point and the corresponding point of the above arbitrary point in the set $T^k$, for any point in the set $S^k$. This measure is symmetrical and differentiable everywhere.

The multi-stage shape similarity constraint condition can be written as:

$$L_1(k) = \Sigma_{k=K}{}^0 L_{CD}(k).$$

Wherein, $L_1(k)$ represents the sum of the CD of the preprocessed resampling model and the deformation reconstruction model in the $k^{th}$ deformation stage. k represents the serial number of the abstract levels. K represents the number of abstract levels. $L_{CD}(k)$ represents the $k^{th}$ deformation stage, which is the CD of $S^k$ and $T^k$.

(2.2) A point set deformation topological consistency constraint condition, to in the multi-stage deformation reconstruction process, keep the deformation offset of the adjacent points in step 3 similar, as the deformation regular term constraint. This constraint encourages adjacent points in the template to remain similar after being deformed, and punishes points in the same local neighborhood to be scattered far away.

For any adjacent deformation stage (from coarse to fine), first calculate the point-to-point Euclidean distance in the template, thereby construct a penalty coefficient. The farther between the two points i and j in $T^k$, the smaller the penalty coefficient. Then the point set deformation topological consistency constraint condition is:

$$\omega_{i,j} = \exp(-\|p_i - p_j\|_2), \forall p_i \in T^k, \forall p_j \in T^k.$$

Wherein, i represents the serial number. j represents the serial number. $\omega_{i,j}$ represents the penalty coefficient. $p_i$ represents the $i^{th}$ point in $T^k$. $p_j$ represents the $j^{th}$ point in $T^k$.

$$L_{reg}(k) = \Sigma_{0 < i \neq j \leq N} \omega_{i,j} \|d^k(i) - d^k(j)\|_2.$$

Wherein, k represents the serial number of the abstract levels. $L_{reg}(k)$ represents the regular term constraint of the $k^{th}$ abstract level. $\omega_{i,j}$ represents the penalty coefficient. i represents the serial number. j represents the serial number. $d^k(i)$ represents the predicted offset of the $i^{th}$ point in $T^k$, $d^k(j)$ represents the predicted offset of the $j^{th}$ point in $T^k$.

The multi-stage point set deformation topological consistency constraint condition can be written as:

$$L_2(k) = \Sigma_{k=K}{}^0 L_{reg}(k).$$

Wherein, $L_2(k)$ represents the regular term constraint of the multi-stage abstract level. k represents the serial number of the abstract levels. K represents the number of abstract levels. $L_{reg}(k)$ represents the regular term constraint of the $k^{th}$ abstract level.

(3) Specific Embodiments

The density correspondence between models established based on the three-dimensional model's spherical expression requires a set of models to be aligned first and unified in orientation.

Fine-grained classification categories define the regional positioning. The objects in a set are classified by fine-grains. For example, a set of chairs can be subdivided into categories such as armchairs, swivel chairs, and so on. Performing ball expression on them and using ball expression for fine-grained classification can locate the relevant area that has the most ability to characterize the category between the subdivided categories.

Shape geometry migration and co-editing use ball expression to establish density correspondence between models. When editing a model, the editing operation can be propagated to the relevant areas of other models in the set, to implement the co-editing of three-dimensional models.

III. Multi-Resolution Point Cloud Preprocessing Method

The multi-resolution point cloud abstract preprocessing is to automatically generate the multi-stage shape reconstruction target required in the above three-dimensional model's spherical expression calculation process. The multi-stage reconstruction target is required to have a matching number of points, and be able to describe shapes from coarse to fine of different stages.

The steps of the multi-resolution point cloud and processing method mainly include point cloud down-sampling and Gaussian redistribution.

(1) Point cloud down-sampling is to process dense point clouds into relatively sparse point clouds, being an abstract processing of the original model; for a point cloud model (containing N points), specify the sampling parameter M<N, as the number of sampling points. After down-sampling, the number of model points decreases from N to M, wherein M divides N with no remainder, and it is necessary to make sure that the model after down-sampling covers the original model as much as possible.

(2) Gaussian redistribution is to maintain the equipotential of model point sets of different resolutions while abstracting, so as to provide more accurate supervision and guidance during deformation reconstruction. With each sampling point as the center, use probability distribution functions such as Gaussian distribution etc. to spread N/K points, such that the entire point cloud model still remains composed of N points. Gaussian redistribution is also a modeling of the point cloud distribution probability: the sampling point is the center, and the closer to the point, the higher the probability of the point's existence.

After the above steps, the obtained multi-resolution point cloud has the following properties:

$|S^{k+1}|, \forall k \in [1,K]$.

Wherein, k represents the serial number of the abstract levels. K represents the number of abstract levels. $S^k$ represents the preprocessed resampling model of the $k^{th}$ level. $S^{k+1}$ represents the preprocessed resampling model of the $k+1^{th}$ level. The above equation represents the equipotential of the multi-resolution point cloud set at different stages (with a matching number of elements);

$S^k = \cup_{i=1}^{N^k} \{X | gauss(x|\mu=s_i^k, \sigma^2)\}$.

Wherein, k represents the serial number of the abstract levels. K represents the number of abstract levels. $S^k$ represents the preprocessed resampling model of the $k^{th}$ level. $N^k$ represents the number of sampling points at the $k^{th}$ abstract level.

The above equation expresses the process of Gaussian redistribution: suppose the number of sampling points at the $k^{th}$ abstract level is $N^k$, then spread or distribute $N/N^k$ points around any sampling point $s_i^k$. $X \in R^3$ is a random variable. This conforms to the Gaussian distribution with sampling point $s_i^k$ as the mean and $\sigma^2$ as the variance. Around each sampling point, the potential of the set $\{X | gauss(x|\mu=s_i^k, \sigma^2)\}$ is $N/N^k$.

$S^k \approx S^{k+1}, \forall k \in [1,K]$.

Wherein, k represents the serial number of the abstract levels. K represents the number of abstract levels. $S^k$ represents the preprocessed resampling model of the $k^{th}$ level. $S^{k+1}$ represents the preprocessed resampling model of the $k+1^{th}$ level. After the farthest point sampling and Gaussian redistribution, the low-resolution coarse reconstructed target point cloud can cover the high-resolution fine point cloud, which is the equivalent description with the same shape, that is, the meaning expressed by the third formula. Wherein, when k=0, it represents the original three-dimensional point cloud without abstraction.

The above description is only some preferred embodiments of the present disclosure and an explanation of the applied technical principles. Those skilled in the art should understand that the scope of disclosure involved in the embodiments of the present disclosure is not limited to the technical solutions formed by the specific combination of the above technical features, but should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:

1. A method for ball expression calculation for a three-dimensional model, comprising:
    step 1: processing an input three-dimensional model into a dense point cloud model, and performing multi-resolution point cloud abstract preprocessing, to obtain an abstract preprocessed point cloud model;
    step 2: inputting the dense point cloud model into a feature extraction module, down-sampling the point cloud for a predetermined number of times and extracting high-dimensional feature vectors of different abstract levels, to obtain a set of high-dimensional feature vectors;
    step 3: inputting the high-dimensional feature vectors, a template ball point cloud and the abstract preprocessed point cloud model to a point cloud deformation reconstruction module to generate a reconstructed point cloud model, and repeating step 3 for a predetermined number of times, to obtain a deformed reconstruction point cloud model;
    step 4: extracting multi-stage deformation reconstruction process information in step 3, combining the multi-stage deformation reconstruction process information with the template ball point cloud to together form complete information describing the three-dimensional model to obtain a three-dimensional model's spherical expression, wherein the multi-stage deformation reconstruction process information includes a deformation reconstruction point-by-point offset and a high-dimensional feature vector;
    step 5: based on the three-dimensional model's spherical expression, obtaining a density correspondence from the three-dimensional model to the template ball point cloud and a density correspondence between different three-dimensional models, wherein the density correspondence is suitable for a variety of three-dimensional geometric analysis and editing applications.

2. The method of claim 1, wherein, the processing an input three-dimensional model into a dense point cloud model and performing multi-resolution point cloud abstract preprocessing to obtain an abstract preprocessed point cloud model, comprising:
    step 1.1: performing a point cloud down-sampling process to the three-dimensional model, to generate relatively sparse point cloud models;
    step 1.2: performing Gaussian redistribution to the relatively sparse point cloud models, to generate the abstract preprocessed point cloud model.

3. The method of claim 2, wherein, the inputting the high-dimensional feature vectors, template ball point cloud and the abstract preprocessed point cloud model to a point cloud deformation reconstruction module to generate a reconstructed point cloud model and repeating step 3 for a predetermined number of times to obtain a deformed reconstruction point cloud model, comprising:
    step 3.1: inputting the abstract preprocessed point cloud model into the point cloud deformation reconstruction module;
    step 3.2: based on the template ball point cloud and the high-dimensional feature vector, predicting the point-by-point deformation offset through a deep neural network, then outputting the reconstruction point cloud model after deformation, to obtain a deformed reconstruction point cloud model, wherein, a deformation reconstruction optimizing process includes two constraint target conditions.

4. The method of claim 3, wherein, the constraint target conditions include a multi-stage shape similarity constraint condition and a point set deformation topological consistency constraint condition, the multi-stage shape similarity constraint condition is a constraint to, in a multi-stage deformation reconstruction process, keep reconstruction results of each stage and the preprocessed multi-resolution point cloud abstract preprocessing result, while the point set deformation topological consistency constraint condition is a constraint to keep deformation offset of adjacent points in step 3 similar in the multi-stage deformation reconstruction process, as a deformation regular term constraint, and the multi-stage deformation reconstruction process comprises constraint target conditions.

5. The method of claim 4, wherein, for any deformation stage, a chamfer distance CD is used to measure a similarity between a reconstructed point cloud and a target point cloud, a point set distance is CD, and a shape similarity constraint condition is:

$$L_{CD}(k) = \sum_{p_i \in S^k} \min_{q_j \in T^k} \|p_i - q_j\|_2^2 + \sum_{q_i \in T^k} \min_{p_j \in S^k} \|q_j - p_i\|_2^2,$$

wherein, k represents a serial number of the abstract levels, $L_{CD}(k)$ represents a CD of a $k^{th}$ deformation stage $S^k$ and $T^k$, $S^k$ represents the abstract preprocessed point cloud model of a $k^{th}$ abstract level, $T^k$ is the deformation reconstruction model of the $k^{th}$ abstract level, $p_i$ represents a point in the point cloud model $S^k$, $q_j$ represents a point in the point cloud model $T^k$, above formula calculates a distance between two point sets, a specific calculation method being to, for any point in set $S^k$, calculate square of a distance between arbitrary point and a nearest point of the arbitrary point in set $T^k$, this measure is symmetrical;

the multi-stage shape similarity constraint condition is:

$$L_1(k) = \Sigma_{k=K}^K L_{CD}(k),$$

wherein, $L_1(k)$ represents a sum of the CD of the abstract preprocessed point cloud model and the deformed reconstruction point cloud model in a $k^{th}$ deformation stage, k represents the serial number of the abstract levels, K represents a number of the abstract levels, and $L_{CD}(k)$ represents the CD of the $k^{th}$ deformation stage i.e. $S^k$ and $T^k$.

6. The method of claim 5, wherein, in the multi-stage deformation reconstruction process, the deformation offsets of the adjacent points are consistent, and for any adjacent deformation stage, a point-to-point Euclidean distance in the template is first calculated, thereby constructing a penalty coefficient $\omega_{i,j}$, meeting the farther between two points i and j, the smaller the penalty coefficient $\omega_{i,j}$, let a predicted offset of a point of the k level be $d^k(i)$, then the point set deformation topological consistency constraint condition formula is:

$$\omega_{i,j} = \exp(-\|p_i - p_j\|_2), \forall p_i \in T^k, \forall p_j \in T^k,$$

wherein, i represents serial number, j represents serial number, $\omega_{i,j}$ represents the penalty coefficient, $p_i$ represents a $i^{th}$ point in $T^k$, $P_j$ represents a $j^{th}$ point in $T^k$;

$$L_{reg}(k) = \Sigma_{0 < i \neq j \leq N} \omega_{i,j} \|d^k(i) - d^k(j)\|_2,$$

wherein, k represents the serial number of the abstract levels, $L_{reg}(k)$ represents the regular term constraint of the $k^{th}$ abstract level, $\omega_{i,j}$ represents the penalty coefficient, i represents the serial number, j represents the serial number, $d^k(i)$ represents the predicted offset of the $i^{th}$ point in $T^k$, $d^k(j)$ represents the predicted offset of the $j^{th}$ point in $T^k$;

the multi-stage point set deformation topological consistency constraint condition is:

$$L_2(k) = \Sigma_{k=K}^K L_{reg}(k),$$

wherein, $L_2(k)$ represents the regular term constraint of the multi-stage abstract level, k represents serial number of the abstract levels, K represents a number of the abstract levels, and $L_{reg}(k)$ represents the regular term constraint of the $k^{th}$ abstract level.

7. The method of claim 6, wherein, the three-dimensional model's spherical expression is:

$$CS := \{T^K D^k, z^k | K = 1, \ldots, K\},$$

wherein, CS: represents the three-dimensional model's spherical expression, $T^K$ represents the deformation reconstruction model of the $k^{th}$ abstract level, and is also the template ball point cloud, $D^k$ represents the point-by-point offset of the $k^{th}$ abstract level, $z^k$ represents the high-dimensional feature vector of the $k^{th}$ abstract level, k represents the serial number of the abstract levels, and K represents the number of the abstract levels.

* * * * *